United States Patent
Seydoux et al.

(10) Patent No.: US 9,709,983 B2
(45) Date of Patent: Jul. 18, 2017

(54) LONG-RANGE DRONE REMOTE-CONTROL EQUIPMENT

(71) Applicant: PARROT DRONES, Paris (FR)

(72) Inventors: Henri Seydoux, Paris (FR); Arsene Ferrand, Paris (FR); Nicolas Brulez, Paris (FR); Farid Zaouia, Paris (FR)

(73) Assignee: Parrot Drones, Paris (FR)

( * ) Notice: Subject to any disclaimer, the term of this patent is extended or adjusted under 35 U.S.C. 154(b) by 0 days.

(21) Appl. No.: 14/935,348

(22) Filed: Nov. 6, 2015

(65) Prior Publication Data

US 2016/0132052 A1    May 12, 2016

(30) Foreign Application Priority Data

Nov. 12, 2014 (FR) ...................... 14 60876

(51) Int. Cl.
- A63H 30/04 (2006.01)
- G05D 1/00 (2006.01)
- B64C 39/02 (2006.01)
- G08C 17/02 (2006.01)
- A63H 27/00 (2006.01)

(52) U.S. Cl.
CPC ........... *G05D 1/0022* (2013.01); *A63H 27/12* (2013.01); *A63H 30/04* (2013.01); *B64C 39/024* (2013.01); *G08C 17/02* (2013.01); *B64C 2201/024* (2013.01); *B64C 2201/123* (2013.01); *B64C 2201/146* (2013.01); *G08C 2201/93* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,564,134 A | * | 2/1971 | Rue | G05D 1/0038 244/190 |
| 3,742,495 A | * | 6/1973 | Diamantides | G01S 5/0009 342/58 |
| 5,878,981 A | * | 3/1999 | Dewey | B64C 13/24 244/190 |
| 2011/0211084 A1 | * | 9/2011 | Sturzel | G06T 7/0042 348/211.99 |
| 2012/0015686 A1 | | 1/2012 | Krupnik | |

FOREIGN PATENT DOCUMENTS

| | | |
|---|---|---|
| DE | 10 2012 012462 A1 | 12/2013 |
| EP | 2 450 862 A1 | 5/2012 |
| JP | 2004 064418 A | 2/2004 |

\* cited by examiner

*Primary Examiner* — Edward J Pipala
(74) *Attorney, Agent, or Firm* — Haverstock & Owens LLP

(57) ABSTRACT

This unit implements a remote-control console (20) supporting a tablet (18). The console comprises a TX/RX module (48) interfaced with a TX/RX module (50) of the tablet to form a first Wi-Fi local network, which is a short-range standard network. The console comprises another specific TX/RX module (54), interfaced with an TX/RX module (58) of the drone (10) to form a second Wi-Fi local network, which is an optimized long-range network, both being networks operating on non-shared channels. A bidirectional routing module (78) ensures the interfacing between the two Wi-Fi networks, to allow the transparent exchange of data between the drone (10) and the tablet (18), as well as with levers and buttons of the console (64, 66) or with a peripheral (80) connected thereto.

7 Claims, 2 Drawing Sheets

(State of the art)

LONG-RANGE DRONE REMOTE-CONTROL EQUIPMENT

FIELD OF THE INVENTION

The invention relates to the exchange of data and the remote piloting of motorized devices, generally referred to as "drones" hereinafter.

BACKGROUND OF THE INVENTION

They may be flying drones, in particular rotary-wing drones such as helicopters, quadricopters and the like. But the invention is however not limited to the piloting of and the data exchange with flying devices; it applies as well to rolling devices progressing on the ground under the control of a remote operator, the term "drone" having of course to be understood in its most general meaning.

A typical example of flying drone is the AR.Drone 2.0 or the Bebop (registered trademarks) from Parrot SA, Paris, France, which are quadricopters equipped with a series of sensors (accelerometers, gyrometers, altimeters), a front video camera capturing an image of the scene towards which the drone is directed, and a vertical-view camera capturing an image of the overflown ground. Another type of drone to which the invention may apply is the Jumping Sumo, also from Parrot SA, which is a remote-controlled rolling and jumping toy provided with accelerometer and gyrometer sensors and with a front video camera.

The front video camera can be used for an "immersive mode" piloting of the drone, i.e. where the operator uses the image of the camera in the same way as if he were himself on board the drone. It may also serve to capture sequences of images of a scene towards which the drone is directed, the operator using the drone in the same way as a camera that, instead of being held in hand, would be borne by the drone. The collected images can be recorded, put online on web sites, sent to other Internet users, shared on social networks, etc.

The WO 2010/061099 A2, EP 2 364 757 A1 and EP 2 450 862 A1 (Parrot) describe the principle of piloting a drone through a touch-screen multimedia telephone or tablet having integrated accelerometers, for example a smartphone of the iPhone type or a tablet of the iPad type (registered trademarks).

Hereinafter, the term "tablet" will be generally used to refer to this device, but this term must not be understood in its narrow meaning; quite the contrary, it also includes the functionally equivalent devices, in particular all the portable devices provided with at least one visual display screen and wireless data exchange means, such as smartphone, multimedia player with no phone functions, game console, etc.

The tablet incorporates the various control elements required for the detection of the piloting commands and the bidirectional exchange of data via a radio link of the Wi-Fi (IEEE 802.11) or Bluetooth wireless local network type directly established with the drone. Its touch screen displays the image captured by the front camera of the drone, with, in superimposition, a certain number of symbols allowing the control of the flight and the activation of commands by simple contact of the users finger on this touch screen.

The bidirectional wireless radio link comprises an uplink (from the tablet to the drone) and a downlink (from the drone to the tablet) to transmit data frames containing:

(from the tablet to the drone) the piloting commands, hereinafter simply called "commands", sent at regular intervals and on a systematic basis;

(from the drone to the tablet) the video flow coming from the camera; and (from the drone to the tablet) as needed, flight data established by the drone or state indicators such as: level of the batteries, flight phase (take-off, automatic stabilisation, landed on the ground, etc.), altitude, detected fault, etc.

The invention more precisely relates to the bidirectional transmission, with an increased range, of these commands and data between the drone and the tablet.

Indeed, a remote control via a direct Wi-Fi radio link, as described in the above-mentioned EP 2 450 862 A1, has a limited range, of at most about fifty meters, which corresponds to piloting a drone that remains in direct view of the operator.

If a greater range is desired, a first solution consists in using a Wi-Fi range extender (repeater), which is a transceiver acting as a relay and provided with a power amplifier allowing to increase the power radiated on the radio channel used between the tablet and the receiver. The range can hence be increased up to 200 meters.

This technique has however a drawback, due to the very high variability of the binary rate or bitrate of the radio link (such bitrate being often called the "bandwidth"). This bitrate depends in particular on the distance between the drone and the tablet, and on the presence or not of obstacles liable to more or less disturb the transmission of the radio waves. When the drone moves away from the tablet, the available bitrate deteriorates rapidly, which will cause a conflict between the uplink flow (sending of the commands) and the downlink flow (essentially the video flow).

Indeed, an important parameter to be considered is the very high need in video bitrate of the downlink, very higher than that required for the sending of the flight commands and data. Typically, the required video bandwidth is, even after compression of the images, of the order of 2.5 to 3 Mbits per second (Mbps), to be compared to a few kilobits per second (kbps) for the sending of the flight commands and data, which are not simple numerical values. In other words, the video occupies typically more than 95% of the available bitrate.

That way, the bitrate reduction will have an impact on the bitrate allocated to the commands by the uplink, hence it will follow a deterioration of the quality of transmission of the uplink, with a risk of sporadic loss of frames containing the commands produced by the tablet, and for consequence a control of the drone becoming very difficult.

To remedy this drawback, it is possible to provide two different links, one for the video and the other for the flight commands and data: in this case, the video return of the drone towards the tablet is operated by a Wi-Fi link with relay by the Wi-Fi repeater, whereas the flight commands and data are exchanged with a dedicated remote-control device (box provided with joysticks, cursors, buttons, etc.) via a radio link adapted to the exchange of the only flight commands and data with the drone, this link being distinct from the Wi-Fi link of transmission of the video flow.

This solution (that will be exposed in more details hereinafter with reference to FIG. 2) remedies to the risk of conflict between the video flow and the flight command and data flow. On the contrary, it has three major drawbacks:

the use of a repeater involves a time share of the channel between the drone and the tablet, which limits on each side (tablet/repeater and repeater/drone) the bitrate to 50% of what would be obtained with a direct Wi-Fi link between the tablet and the drone;

the repeater being an equipment of the symmetrical type, if it transmits a powerful signal towards the drone, it will also transmit a powerful signal towards the tablet, with a risk of saturation because the latter is far closer to the repeater than the drone;

if a high range is desired, it is necessary to use a non-standard Wi-Fi protocol, in particular to take into account a high latency due to the distance. The modification of the protocol must be applied to the whole link, both on the tablet/repeater side and on the repeater/drone side, so that the Wi-Fi that must be implemented by the tablet will no longer be a standard Wi-Fi.

The DE 10 2012 012 462 A1 describes a configuration comprising a remote-control console, a tablet incorporated to the console, and a remote-control model. Each of these three elements is provided with a processor and a communication interface incorporating in particular a wireless communication module of the Bluetooth type. The configuration may further be supplemented by a signal converter interfaced (wirelessly or through a cable) to the console, as well as to the tablet and to the model. This converter serves as a communication hub between these three elements. The model may hence be indifferently remote-controlled from the console or from the tablet, which then plays the role of an auxiliary or emergency remote control with respect to the main remote control formed by the console. Hence, in case of failure of the console or the tablet, the user still has an operational remote control that allows it to safely bring back the model to the right place.

SUMMARY OF THE INVENTION

The object of the invention is to remedy the various drawbacks mentioned hereinabove, by proposing a new architecture of communication network:

that ensures with the drone a Wi-Fi link optimized for a long distance (with a robust protocol, a simple radio modulation, etc.) but with no time share of the radio channel used, so as to be able to benefit from the totality of the potential bitrate of the channel used;

that can transmit towards the drone a powerful signal, so as to be able to communicate with the latter within a very long range, typically up to 2 km, with no risk of saturation of the signal of the tablet side nor of interference with devices located nearby;

and that, without compromising nor limiting the two previous objectives, ensures an interoperability with any type of tablet, through a link with the latter operated according to a non-modified Wi-Fi protocol. In other words, the Wi-Fi that will be used by the tablet must remain a standard Wi-Fi, not optimized for a long distance, and keeping the possibility to use the tablet to display flight parameters and to send commands by an action on the touch screen, in the same way as in the case of a visual flight, within a short range.

It will be noted, herein and thereafter, that by "long range" or "long distance", it is meant a hectometric range, i.e. from several hundreds of meters to several kilometers, by opposition to a "short range" or "short distance", which will be a centimetric range, of a few centimeters or tens of centimeters.

To reach the above-mentioned objects, the invention proposes a unit for the bidirectional transmission of data between a remote-control equipment and a remote drone, said data comprising piloting commands, flight parameters and a video flow.

This unit comprises, in a manner known per se and disclosed in the above-mentioned DE 10 2012 012 462 A1:

a drone comprising: piloting circuits; an on-board video camera; and a long-range wireless transceiver module, coupled to the piloting circuits and to the on-board video camera;

a portable device of the tablet type comprising: a visual display screen; a software module including a drone piloting and image visualization applicative module; and a short-range wireless transceiver module; and a remote-control console, comprising: a support receiving the tablet; a short-range wireless transceiver module, interfaced with the short-range wireless transceiver module of the tablet; a long-range wireless transceiver module, interfaced with the long-range wireless transceiver module of the drone; and levers and buttons adapted to generate flight commands as a function of actions exerted on these levers and buttons, Characteristically of the invention:

the console comprises a software module including a bidirectional routing module for the exchange of said data, this routing module being coupled to the short-range and long-range wireless transceiver modules as well as to the levers and buttons;

the short-range wireless transceiver module of the console is interfaced with the short-range wireless transceiver module of the tablet to form a short-range tablet local network;

the long-range wireless transceiver module of the console is interfaced with the long-range wireless transceiver module of the drone to form a long-range drone local network;

the short-range tablet local network and the long-range drone local network are distinct wireless networks and operate on non-shared channels;

the short-range tablet local network is a network operating according to a non-modified, standard protocol, whereas the long-range drone local network is a network operating according to a non-standard, dedicated network; and said data are exchanged: between the drone and the tablet through the tablet local network interfaced with the drone local network via the routing module; and between the levers and buttons and the drone through the drone local network via the routing module.

The non-standard, dedicated protocol of the long-range drone local network may in particular be a protocol providing a waiting time for the frame receipt acknowledgment that is longer than the value specified by the standard protocol.

In a preferential implementation, the console software module comprises a series of software layers including a first operating system core, a first operating system over-layer, and a first applicative layer, containing said routing module. The tablet software module also comprises a series of software layers including a second operating system core, a second operating system over-layer, and a second applicative layer, similar to said first applicative layer of the console software module, but containing no active routing module.

Advantageously, the second applicative layer of the tablet software module also contains a second routing module, similar to said first routing module of the console software module, but this routing module is deactivated.

According to various advantageous subsidiary characteristics:

the short-range tablet local network and the long-rang drone local network are both networks according to the IEEE 802.11;

the long-range wireless transceiver module of the drone is configured as an access point AP and the long-range wireless transceiver module of the console is configured as a mobile station STA, and the short-range wireless transceiver module of the console is configured as an access point AP and the short-range wireless transceiver module of the tablet is configured as a mobile station STA;

the console further comprises a short-range omnidirectional antenna system coupled to the short-range wireless transceiver module and a long-range directional antenna system coupled to the long-range wireless transceiver module;

the console further comprises indicators for displaying drone state information, such state information being transmitted from the drone to the routing module of the console through the drone local network, and the routing module is adapted to transmit the state information to the display screens of the console, for a visualization by means of these indicators, and to the tablet through the tablet local network, for a visualization on the tablet screen;

the console further comprises means for coupling the routing module to an auxiliary visualization and/or of data input/output equipment.

BRIEF DESCRIPTION OF THE DRAWINGS

An example of implementation of the unit of the invention will now be described, with reference to the appended drawings in which the same references denote identical or functionally similar elements throughout the figures.

DETAILED DESCRIPTION OF THE INVENTION

Figure 1:
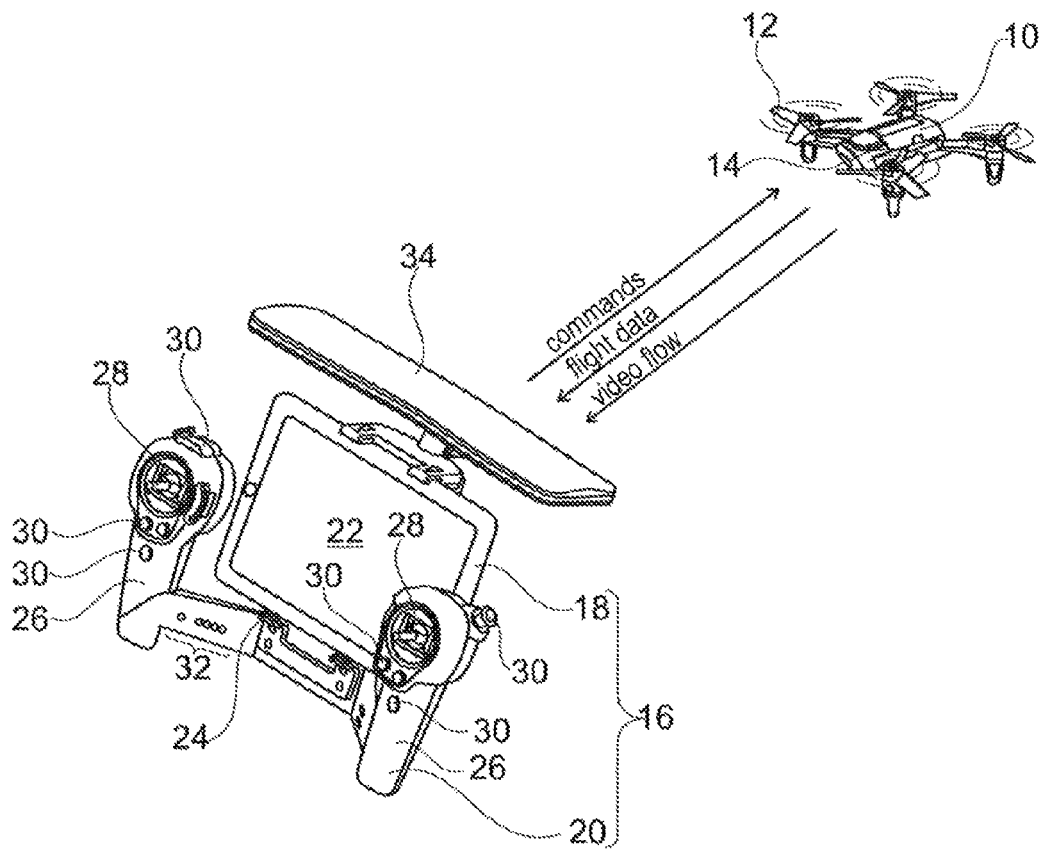
FIG. 1 is an overall view showing the different elements of the invention, with the drone, the tablet and the remote-control console.

In FIG. 1, the reference 10 generally denotes a drone, for example a flying drone of the quadricopter type such as the Bebop model from Parrot SA, Paris, France. This drone includes four coplanar rotors 12 whose motors are piloted independently by an integrated navigation and attitude control system. The drone also includes a front-view camera 14 allowing to obtain an image of the scene towards which the drone is directed, for example a high-definition wide-angle camera, having a CMOS sensor of resolution 1920×1080 pixels and a video flow refresh rate of 30 fps (frames per second).

The drone is piloted by a unit 16 comprising a remote-control console 20 associated with a tablet 18.

The tablet 18 is a conventional tablet, for example of the iPad type (registered trademark) or the like, comprising a visual display screen 22, in which has been loaded an applicative software module for piloting the drone 10 and for visualizing the images taken by the on-board camera 14. The tablet 18 is moreover equipped with a data exchange radio interface, for example of the Wi-Fi type. It is a tablet of a standard motel, not modified except the loading of the applicative software module.

The screen 22 of the tablet 18 displays the image of the scene captured by the on-board camera 14 of the drone with, in superimposition, a certain number of symbols allowing the control of various navigation parameters. This screen is a touch screen allowing the activation of piloting commands by simple contact of an operator's finger on the symbols displayed on the screen (up/down displacements, attitude control, etc.). Those actions are interpreted by the applicative software that transforms them into command signals intended to the drone, sent on the data exchange Wi-Fi interface. Conversely, the flight data coming from the drone, received by the Wi-Fi interface, are delivered to the applicative software to be processed therein and possibly be displayed on the screen 22 of the tablet.

The production of commands from the touch screen of the tablet will however be used herein only subsidiarily, the different commands being duplicated and complemented by actions on various buttons and levers of the console 20.

More precisely, the console 20 includes a support 24 allowing to fasten the tablet 18 to the console, in front of the operator so that the latter can see the totality of the surface of the screen 22. The body of the console 20 is extended on each side by handles 26 provided with various control members such as levers 28 of the "joystick" type and buttons 30 arranged within reach of the operator's fingers and each associated with a particular command (take-off/landing, return to start point, triggering of the recording of the scene captured by the camera, etc.). The console 20 is also provided with various luminous indicators 32 (level of the drone battery, recording in progress, etc.), as well as connection arrangements (not shown) allowing the plugging of accessories as, for example, virtual reality glasses with an integrated screen, usable as an alternative to the visual display screen 22 of the tablet.

The console 20 is also provided with a long-range directional, directive Wi-Fi antenna 34, that the operator directs towards the drone when he has the remote-control console 20 in hands.

Figure 2:
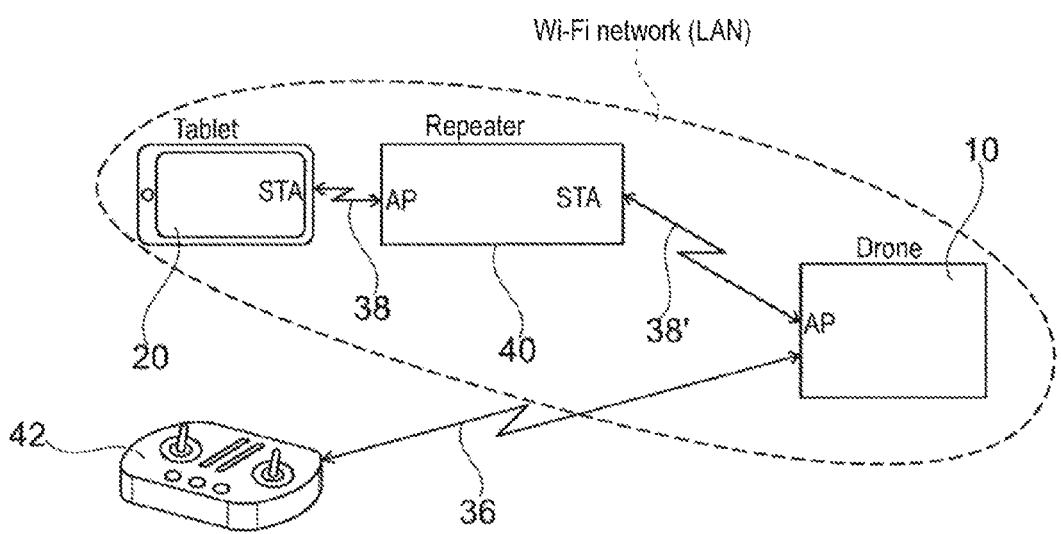
FIG. 2 schematically shows a network architecture according to the state of the art, for the long-distance remote-control of a drone.

In FIG. 2 is schematically illustrated a conventional architecture allowing to ensure a long-distance remote control of the drone 10.

This technique is based on the use of two different radio links, one 36 for the exchange of the flight commands and data with the drone, the other 38, 38' for the transmission of the video flow.

To ensure a long range between the drone 10 and the tablet 20 by the video flow transmission Wi-Fi link, a Wi-Fi repeater 40 is placed in the Wi-Fi local network (LAN) including the drone 10 and the tablet 20. The drone is in AP (access point) mode and the tablet in STA (station) mode and the AP/STA repeater is interposed between these two elements of the Wi-Fi local network, the drone 10 and the tablet 20 exchanging data on a common channel.

The exchange of the flight commands and data is made by a distinct link 36 with a remote-control device 42, a link established totally independently of the Wi-Fi local network between the drone 10 and the tablet 20 via the intermediate repeater 40.

As briefly explained in introduction, this conventional architecture has several drawbacks:

firstly, to reach a high range, it is necessary to have a robust radio link, with simple modulations, which has for consequence a low bitrate. When the repeater 40 is interposed on this link, it shares on a time basis the channel used, which has for effect to limit the bitrate by 50%, on the tablet side as well as on the drone side;

secondly, the communication protocol must be optimized, in particular by increasing the waiting time for the frame receipt acknowledgment (ACK timeout) to take into account the increase of the information transmission time due to the long distance. The matter is hence no longer a standard Wi-Fi protocol, and, as the modification of these parameters is effective for the two branches 38 (tablet/repeater) and 38' (repeater/drone) of the link, the Wi-Fi that the tablet must operate is no longer a standard Wi-Fi and the latter must be adapted accordingly;

thirdly, to reach a significant range, it is necessary to transmit a powerful signal towards the drone, which is allowed by the repeater 40. But this repeater will then converse under this strong power with the drone 10 as well as with the tablet 20, which introduces a high risk of saturation on the side of the signal received by the tablet.

Figure 3:
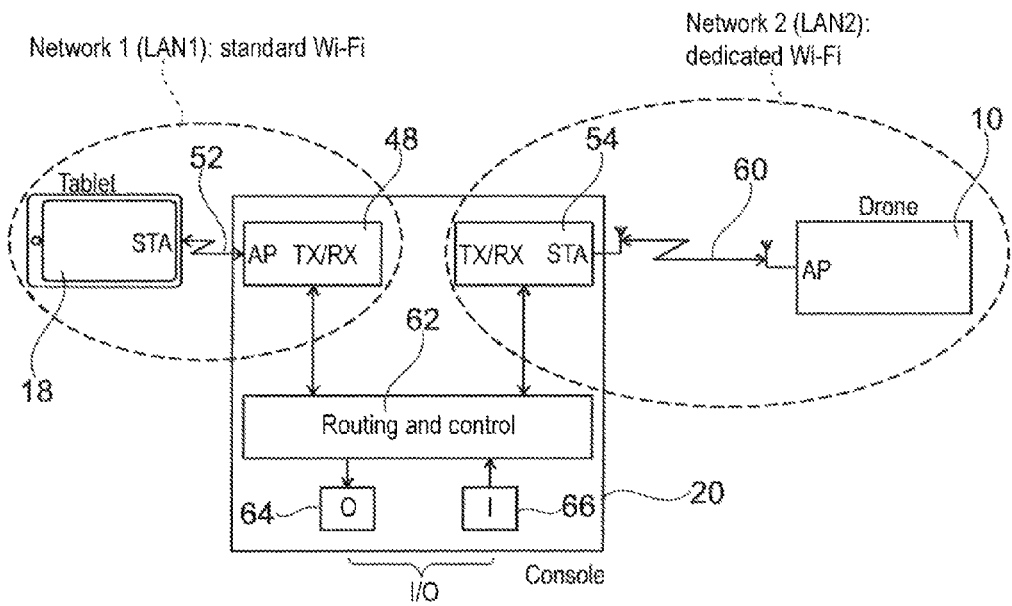
FIG. 3 schematically shows a network architecture according to the invention, for the long-distance remote-control of a drone by a tablet.
Figure 4:
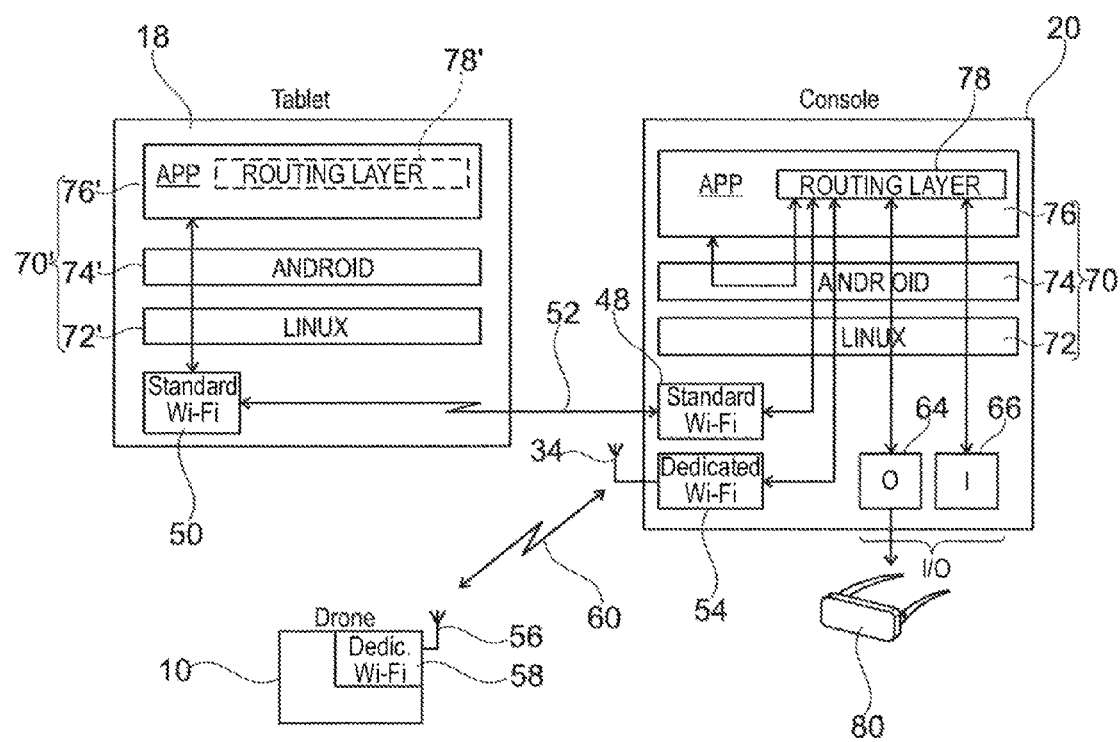
FIG. 4 is a representation as a block diagram of the different functional elements present in the tablet, in the remote-control console and in the drone for the implementation of the architecture of the invention.

The invention proposes an original architecture, schematically illustrated in FIGS. 3 and 4, allowing to solve these various drawbacks.

The basic principle of the invention consists in providing two distinct Wi-Fi links, and hence two distinct Wi-Fi local networks, one dedicated to the drone and the other dedicated to the tablet.

The first network, LAN1, is a short-range tablet local network, formed directly between a transceiver module 48 integrated to the console 20 and the standard, Wi-Fi transceiver module 50 (FIG. 4) of the tablet. The module 48 of the console operates as an access point AP, and the module 50 of the tablet as a station STA. The Wi-Fi link 52 between these modules 48 and 50 is a non-modified, standard link, and the transmitter of the module 48 is a low-power transmitter, due to the very great proximity between the console 20 and the tablet 18, which is fastened to this console.

The second network, LAN2, is a drone local network that operates on a different channel than that of the tablet local network LAN1.

This network is formed between a transceiver module 54 of the console 20 and a transceiver module 58 of the drone. The drone is configured as an access point AP and the module 54 as a station STA. The Wi-Fi link 60 between these two modules 54 and 58 is a long-distance link, optimized so as to keep the highest possible bitrate for the transmission of the video flow, while maximising the range.

A link according to IEEE 802.11n of the dual-band (2.4 GHz/5 GHz) and MIMO type can be used, for example, for this Wi-Fi link 60, with, on the console side, an antenna 34 formed of two directional dual-band patch antennas, with, in the direction of the main lobe a gain of 8 dBi at 2.4 GHz and 12 dBi at 5 GHz, the Wi-Fi transceiver 54 being capable of providing up to 21 dBm at 5 GHz and 16 dBm at 2.4 GHz. The radiation produced (in MIMO) is hence of 36 dBm at 5 GHz and 27 dBm at 2.4 GHz, which allows to maximize the range while remaining in the regulatory limits allowed. As for the drone 10, it uses an antenna 56 consisted of two omnidirectional dual-band dipoles, the Wi-Fi module 58 of the drone being able to provide up to 21 dBm in each of the two bands.

It will be noted that the directivity of the antenna also allows to better capture the signals comping from the drone: the gain of the antenna is added to the power transmitted by the drone, which equilibrates the link balance of the system.

It will also be noted that the long-range network LAN2 between the drone 10 and the console 20 uses on the console side a significant power of transmission, but applied to very directive antennas oriented towards the drone, which limits the power sent to other Wi-Fi devices possibly present nearby the console 20 (mobile phone of the operator or of other persons nearby, etc.).

Characteristically of the invention, the two distinct Wi-Fi networks LAN1 and LAN2 are interfaced by a routing and control module 62 integrated to the console 20.

The routing and control module 62 is also interfaced with inputs/outputs 64, 66 of the console, allowing for example the connection of virtual reality glasses 80 (FIG. 4) or of any other external peripheral to be interface with the drone and/or the tablet.

At the initialization, the module 62 initializes the two networks LAN1 and LAN2 so that they never operate on the same channel, hence avoiding that these two networks LAN1 and LAN2 can disturb each other. The Wi-Fi channels chosen at this stage are preferably the channels detected as being the less congested, which minimizes the risk of interference with other Wi-Fi devices present in the environment of the console.

The long-range network LAN2 can be configured in a non-standard manner, with a communication protocol modified so as to take into account in particular significant times of propagation due to the great distance (up to 2 km) between the console 20 and the drone 10. The matter is in particular to increase the "ACK time out" value. Indeed, if the "ACK time out" value provided by the standard was used, taken into account the times of propagation of the signals, it would not be possible to exceed the range of about 500 m. The lengthening of the value by a non-standard parameter setting allows, exactly, to free from this limitation and to reach in practice ranges far higher than the kilometer.

Insofar as the two networks LAN1 and LAN2 are distinct networks, there is no constraint of interoperability between tablet and drone, and the link between the console and the drone may be optimized at best, in particular with simple radio modulations.

On the other hand, on the tablet side, the Wi-Fi of the short-range network LAN1 may remain a standard Wi-Fi, insofar as there is no need to optimize it for a long distance. The tablet may hence be used as such, as other peripherals connected to the console by wire link via the connection arrangement of the inputs/outputs 64, 66.

The fact to communicate with the tablet according to a non-modified standard Wi-Fi protocol (hence not optimized for a long distance) guarantees the interoperability with any type of tablet. Moreover, it remains possible to use the tablet without the console, for a direct piloting of the drone in short-range visual flight (a few hundreds of meters at most).

On the other hand, it will be noted that, insofar as the networks LAN1 and LAN2 are distinct networks that operate on different channels, the current data bitrate between the tablet 18 and the console 20 is with no effect on the data bitrate between the console 20 and the drone 10, because no time share of a channel is required, unlike techniques implementing a repeater as those exposed hereinabove with reference to FIG. 2.

It will be noted that, during the transmission of data between the drone 10 and the console 20, an optimization algorithm ensures within the drone a regulation of the bitrate of the video sent to the console. The matter is to favour the transmission of the flight commands and data in the video flow, because these commands and data are required to ensure the permanent control of the flight. Such an algorithm is described in particular in the above-mentioned EP 2 450 862 A1, to which it may be referred to for more details.

The software aspects of the architecture according to the invention will now be described with more particular reference to FIG. 4.

The console 20 comprises a software module 70 with an operating system core 72, for example of the Linux type, a user interface over-layer 74, for example of the Android type, and a specific applicative layer 76. The applicative layer 76 comprises a drone piloting and image visualization software APP, as well as a routing layer 78, specific of the invention, advantageously included in the applicative layer 76.

The routing layer 78 is interfaced:
  with the applicative software APP via the user interface layer 74;
  with the two Wi-Fi modules 48 and 54 for the exchange of data with the tablet 18 and with the drone 10, respectively;
  and with the inputs/outputs 64, 66, these latter comprising: the levers and buttons 28, 30 integrated to the console 20, the indicators 32 also integrated to the console 20, and external peripherals, for example virtual reality glasses 80, connectable to the console through a wire link and a suitable connector or a proper wireless link (for example a Blue-tooth link).

This routing layer 78 hence ensures the exchange of various data between the tablet, the drone, the commands, buttons and indicators of the console, as well as with the applicative software for piloting the drone 10 and for visualizing the images, implanted within the console 20.

On the side of the tablet 18, the configuration is similar, with a software module 70' including, as the module 70 of the console: an operating system core 72', a user interface layer 74' and an applicative layer 76', advantageously the same as that, 76, included in the console 20—apart from the fact that the routing layer 78' is herein deactivated, because it won't have any function within the tablet.

Within the console, the routine layer 78 is on the contrary active, and it is viewed as a drone by the piloting and visualization software APP, i.e. the data exchange via this routine layer is transparent for the application APP, which operates in the same way when it is integrated to the remote-control console 20 as if it were operating autonomously, in direct link with the drone according to the conventional short-range configuration, with no console.

Two examples of implementation of the just-described specific architecture of the invention will now be given.

A first example is that of the transmission of a video flow of the camera on board the drone.

The drone transmits the video flow via the Wi-Fi module 58 and the link 60 towards the directional antenna 34 of the console 20. The video flow is received by the dedicated long-range Wi-Fi module 54, from which it is transferred to the routing layer 78. The routing layer then sends simultaneously this video flow towards the standard short-range Wi-Fi module 48 and, as the case may be, towards virtual reality glasses 80 via the output 64. On the tablet side, the video flow is received by the transceiver module 50 and transmitted to the applicative layer 76' that ensures the visualization thereof on the screen of the tablet via the user interface layer 74'.

A second example is that of a command sent from the tablet, for example a "landing" command, asked by pressing on a symbol displayed on the screen of the tablet.

This command, processed by the applicative module 76', is transmitted via the transceiver modules 50 and 48 to the console 20 up to the routing layer 78 (it will be noted that this "landing" command could also be activated by pressing on a dedicated button of the console, corresponding to an input 66 directly interfaced to the routing layer 78). The command is then sent to the drone via the transceiver modules 54 and 58. The landing command is processed within the drone, which operates the suitable actions. Once landed, the drone sends a "landed on the ground" acknowledgment data element, transmitted by the transceiver module 58 and received, on the console side, by the transceiver module 54. The data element is sent to the routing layer 78, which updates the drone state in the applicative software APP, and sends a signal corresponding to the tablet via the transceiver modules 48 and 50, up to the applicative module 76' of the tablet. The applicative module 16' also updates the drone state in its application software APP, and an indication may possibly be displayed to the operator on the tablet screen.

The invention claimed is:

1. A unit for the bidirectional transmission of data between a remote-control equipment (16) and a remote drone (10), said data comprising piloting commands, flight parameters and a video flow, this unit including:
  a drone (10) comprising:
    piloting circuits;
    an on-board video camera (14); and
    a long-range wireless transceiver module (58), coupled to the piloting circuits and to the on-board video camera;
  a portable device of the tablet type (18) comprising:
    a visual display screen (22);
    a software module (70') including a drone piloting and image visualization applicative module (76'); and
    a short-range wireless transceiver module (50); and
  a remote-control console (20), comprising:
    a support (24) receiving the tablet;
    a short-range wireless transceiver module (48), interfaced with the short-range wireless transceiver module (50) of the tablet;
    a long-range wireless transceiver module (54), interfaced with the long-range wireless transceiver module (58) of the drone; and
    levers and buttons (28, 30) adapted to generate flight commands as a function of actions exerted on these levers and buttons,
  this unit being characterized in that:
    the console (20) comprises a software module (70) including a bidirectional routing module (62; 78) for the exchange said data, this routing module being coupled to the short-range (48) and long-range (54) wireless transceiver modules as well as to the levers and buttons (28, 30);
    the short-range wireless transceiver module (48) of the console (20) is interfaced with the short-range wireless transceiver module (50) of the tablet to form a short-range tablet local network (LAN1);
    the long-range wireless transceiver module (54) of the console (20) is interfaced with the long-range wireless transceiver module (58) of the drone to form a long-range drone local network (LAN2);
    the short-range tablet local network (LAN1) and the long-range drone local network (LAN2) are distinct wireless networks and operate on non-shared channels;
    the short-range tablet local network (LAN1) is a network operating according to a non-modified standard protocol, whereas the long-range drone local network (LAN2) is a network operating according to a non-standard dedicated protocol, wherein the non-standard dedicated protocol of the long-range drone local network (LAN2) is a protocol providing a waiting time for the frame receipt acknowledgment that is longer than the value specified by the standard protocol and further wherein the short-range tablet local network (LAN1) and the long-range drone local network (LAN2) are both networks according to IEEE 802.11; and said data are exchanged:
- between the drone (10) and the tablet (18) through the tablet local network (LAN1) interfaced with the drone local network (LAN2) via the routing module (62; 78); and
- between the levers and buttons (28, 30) and the drone (10) through the drone local network (LAN2) via the routing module (62; 78).

2. The unit of claim 1,
wherein the console software module (70) comprises a series of software layers including:
- a first operating system core (72);
- a first operating system over-layer (74); and
- a first applicative layer (76), containing said routing module (78), and wherein the tablet software module (70') also comprises a series of software layers including:
- a second operating system core (72');
- a second operating system over-layer (74'); and
- a second applicative layer (76'), similar to said first applicative layer (76) of the console software module, but containing no active routing module.

3. The unit of claim 2, wherein the second applicative layer (76') of the tablet software module (70') also contains a second routing module (78'), similar to said first routing module (78) of the console software module, but this routing module being deactivated.

4. The unit of claim 1, wherein:
- the long-range wireless transceiver module (58) of the drone is configured as an access point AP and the long-range wireless transceiver module (54) of the console is configured as a mobile station STA, and
- the short-range wireless transceiver module (48) of the console is configured as an access point AP and the short-range wireless transceiver module (50) of the tablet is configured as a mobile station STA.

5. The unit of claim 1, wherein the console further comprises:
- a short-range omnidirectional antenna system coupled to the short-range wireless transceiver module; and
- a long-range directional antenna system coupled to the long-range wireless transceiver module.

6. The unit of claim 1, wherein:
- the console further comprises indicators (32) for displaying drone state information, such state information being transmitted from the drone (10) to the routing module (62) of the console through the drone local network (LAN2); and
- the routing module (62) is adapted to transmit the state information:
  - to the indicators (32) of the console, for a visualization by means of these indicators, and
  - to the tablet (18) through the tablet local network (LAN1), for a visualization on the tablet screen (22).

7. The unit of claim 1, wherein the console further comprises means (64, 66) for coupling the routing module to an auxiliary visualization and/or of data input/output equipment (80).

* * * * *